United States Patent
Adivi et al.

(10) Patent No.: US 11,615,074 B2
(45) Date of Patent: Mar. 28, 2023

(54) SYSTEM AND METHODS FOR INTELLIGENT PATH SELECTION OF ENHANCED DISTRIBUTED PROCESSORS

(71) Applicant: BANK OF AMERICA CORPORATION, Charlotte, NC (US)

(72) Inventors: Suryanarayana Adivi, Telangana (IN); Shilpa Sarang, Maharastra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 124 days.

(21) Appl. No.: 17/060,217

(22) Filed: Oct. 1, 2020

(65) Prior Publication Data
US 2022/0107937 A1     Apr. 7, 2022

(51) Int. Cl.
G06F 16/23     (2019.01)
G06F 16/28     (2019.01)
G06N 20/00     (2019.01)

(52) U.S. Cl.
CPC .......... G06F 16/2379 (2019.01); G06F 16/28 (2019.01); G06N 20/00 (2019.01)

(58) Field of Classification Search
CPC ........................................ G06F 16/23
USPC ........................................ 707/620
See application file for complete search history.

(56) References Cited

U.S. PATENT DOCUMENTS

| | | | |
|---|---|---|---|
| 6,502,096 B1 | 12/2002 | Siefert | |
| 6,944,611 B2 | 9/2005 | Flank et al. | |
| 7,568,200 B2 | 7/2009 | Weiss | |
| 9,569,771 B2 | 2/2017 | Lesavich et al. | |
| 10,102,265 B1 | 10/2018 | Madisetti et al. | |
| 10,121,019 B2 | 11/2018 | Struttmann | |
| 10,255,342 B2 | 4/2019 | Madisetti et al. | |
| 10,722,649 B2 | 7/2020 | Tang | |
| 10,757,084 B1 | 8/2020 | Yu | |
| 10,817,872 B2 | 10/2020 | Lin | |
| 2018/0239959 A1* | 8/2018 | Bui | G06Q 10/103 |
| 2018/0253464 A1 | 9/2018 | Kohli et al. | |
| 2018/0294966 A1 | 10/2018 | Hyun et al. | |
| 2018/0300694 A1 | 10/2018 | Duan et al. | |
| 2019/0068380 A1 | 2/2019 | Tang | |
| 2019/0349733 A1 | 11/2019 | Nolan et al. | |
| 2019/0379538 A1 | 12/2019 | Oh et al. | |
| 2020/0076884 A1 | 3/2020 | Li et al. | |
| 2020/0112443 A1 | 4/2020 | Todd | |
| 2020/0120023 A1* | 4/2020 | Munson | H04L 45/04 |
| 2020/0126048 A1 | 4/2020 | Wu | |
| 2020/0287987 A1 | 9/2020 | Li | |
| 2020/0302533 A1 | 9/2020 | Yang | |
| 2020/0374343 A1* | 11/2020 | Novotny | H04L 67/322 |
| 2021/0117860 A1* | 4/2021 | Ergen | G06N 20/00 |
| 2021/0182804 A1* | 6/2021 | Tavanez | G06Q 20/02 |

* cited by examiner

Primary Examiner — Syling Yen
(74) Attorney, Agent, or Firm — Moore & Van Allen PLLC; Nicholas C. Russell (57) ABSTRACT

The present invention provides systems, methods, and computer program products for a novel system using machine learning and artificially intelligent neural networks to generate, manage, and store data, and also intelligently and effectively manage the routing of data between one or more nodes within a distributed register environment in a dynamic fashion. The invention provides a computer-based system for executing read and write operations between applications involving distributed registers, but is not specifically limited to such embodiments.

17 Claims, 6 Drawing Sheets

SYSTEM AND METHODS FOR INTELLIGENT PATH SELECTION OF ENHANCED DISTRIBUTED PROCESSORS

FIELD OF THE INVENTION

Embodiments of the invention are directed to systems, methods, and computer program products for providing intelligent and intuitive management of data systems involving one or more distributed registers.

BACKGROUND

In conventional systems, network management of database systems in an enterprise environment may be a time-consuming, complex, or inefficient process. Transactions involving use of a distributed register are typically characterized by longer execution time and heavy resource utilization, as not all read and write operations have in built mechanism to identify optimal and most economic execution path. This may lead to unexpected latency and poor performance. Accordingly, there is a need for a more efficient and intelligent way to manage database systems, particularly those involving a distributed register environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present invention addresses the above needs by providing a novel system for using a distributed register to generate, manage, and store data, and also intelligently and effectively manage the routing of data between one or more nodes within the system in a dynamic fashion. The invention provides a computer-based system for executing transactions (e.g., read and write operations) between applications involving distributed registers, but is not specifically limited to such embodiments. Optimum execution is determined on the basis of input load, current workload, historical execution time, node availability, backup capacity, and latency needs. These parameters are utilized in one or more artificial intelligence (AI) based models, which are used to dynamically classify, aid in, or automate the selection of one or more node banks. In addition, the system may include a multi model data repository, and per model output connection data may be fetched and used to aid routing decisions. This repository of multi model data also contributes towards shortening of transaction path by making updated data available for immediate use. As such, the AI driven classification may determine shortest execution path for transactions occurring between two applications.

The distributed register is also utilized to continuously validate and store data related to a catalog of pooled resource deposit services provided by an entity managing the system. The service catalog may comprise user relationship management services, resource planning services, product lifecycle management services, and entity relationship management services, which are able to access, store, and retrieve data from a permissioned distributed register system. Embodiments of the invention may also be tailored to the unique needs or characteristics of one or more geographical regions or markets, such that the products and services offered are designed to comply with varying locally regulations, policies, and customs. The system may further comprise one or more updating components which may trigger the addition of updated data records for one or more resource accounts in the distributed register. In this way, the system provides for a highly efficient way to generate, record, and monitor time deposit resource accounts and associated data.

For sample, illustrative purposes, system environments will be summarized. The system may generally comprise a system for intelligent resource instrument activation, the system comprising: a memory device; and a processing device operatively coupled to the memory device, wherein the processing device is configured to execute computer-readable program code to: receive a path selection request for one or more data transactions from one or more entities or user devices; initiate collection of transaction data, connection data, and latency requirement; parse the path selection request and analyze the collected transaction data, connection data, and latency requirement via a machine learning algorithm; generate a classification scheme for one or more connected nodes of the distributed register environment, wherein the one or more connected nodes of the distributed register environment each contain a complete copy of a distributed register; dynamically update a data repository with the generated classification of the one or more connected nodes; and based on the path selection request and dynamically updated data repository, provide a path selection recommendation in response to the path selection request.

In other embodiments, the one or more data transactions further comprises a read transaction or a write transaction, and the one or more connected nodes of the distributed register environment comprise a read only node or a read and write node.

In further embodiments, the collected transaction data may be structured data, unstructured data, or semi-structured data.

In still further embodiments, the classification scheme for the one or more connected nodes of the distributed register environment comprise a label of highly recommended, satisfactory, or not recommended.

In some embodiments, the system is further configured to provide an updated classification scheme for the one or more connected nodes of the distributed register environment, via the user device, in real time, based on the dynamically updated data repository.

In other embodiments, the system further comprises analyzing the one or more connected nodes of the distributed register environment via the machine learning model based on connection type, connection security protocol, or historical processing time to generate a predicted transaction time for a read transaction or a write transaction.

In still other embodiments, the system is further configured to generate a classification scheme for the one or more connected nodes of the distributed register environment based on an identified availability of one or more connected backup nodes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the distributed register system described herein is implemented. The entity may be a business organization, a non-profit organization, a government organization, or the like, which may routinely use various types of applications within its enterprise environment to accomplish its objectives.

"Entity system" as used herein may refer to computing systems, devices, software, applications, and/or other resources used by an entity to interface with resource account system and distributed register based data storage or services. Accordingly, the entity system may comprise user devices, computers, distributed register database servers, Internet-of-Things ("IoT") devices, networked terminals, smart devices (e.g., smart watches), and/or other types of computing systems or devices along with their associated applications.

"User" as used herein may refer to an individual who may interact with the entity system to store and/or manage resource data or request resource account services. Accordingly, the user may be an agent, employee, associate, contractor, customer, or other authorized party who may access, use, administrate, maintain, and/or manage the computing systems within the entity system. Furthermore, as used herein the term "user device" or "mobile device" may refer to mobile phones, personal computing devices, tablet computers, wearable devices, diagnostic devices, and/or any portable electronic device capable of receiving and/or storing data therein.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Distributed register" or "distributed electronic register" as used herein may refer to a structured list of data records that is decentralized and distributed amongst a plurality of computing systems and/or devices. In some embodiments, the distributed register may be a distributed ledger that includes a chain of entries or entries on a blockchain. As such, distributed register as used herein may also refer to a data structure which may comprise a series of sequentially linked "entries," or "entries," where each entry may comprise data and metadata. The "data" within each entry may comprise one or more "data record" or "transactions," while the "metadata" within each entry may comprise information about the entry, which may include a timestamp, a hash value of data records within the entry, and a pointer (e.g., a hash value) to the previous entry in the distributed register. In this way, beginning from an originating entry (e.g., a "genesis entry"), each entry in the distributed register is linked to another entry via the pointers within the entry headers. If the data or metadata within a particular entry in the distributed register becomes corrupted or modified, the hash values found in the header of the affected entry and/or the downstream entries may become mismatched, thus allowing the system to detect that the data has been corrupted or modified.

Generally, a distributed register is an "append only" register in which the data within each entry within the distributed register may not be modified after the entry is added to the distributed register; data may only be added in a new entry to the end of the distributed register. In this way, the distributed register may provide a practically immutable record of data over time.

"Permissioned distributed register" as used herein may refer to a distributed register for which an access control mechanism is implemented such that only known, authorized users may take certain actions with respect to the distributed register (e.g., add new data records, participate in the consensus mechanism, or the like). Accordingly, "unpermissioned distributed register" as used herein may refer to a distributed register without an access control mechanism.

"Private distributed register" as used herein may refer to a distributed register accessible only to users or devices that meet specific criteria (e.g., authorized users or devices of a certain entity or other organization). Accordingly, a "public distributed register" is a distributed register accessible by any member or device in the public realm.

"Node" as used herein may refer to a computing system on which the distributed register is hosted. Typically, each node maintains a full copy of the distributed register. In this way, even if one or more nodes become unavailable or offline, a full copy of the distributed register may still be accessed via the remaining nodes in the distributed register system.

"Consensus," "consensus algorithm," or "consensus mechanism" as used herein may refer to the process or processes by which nodes come to an agreement with respect to the contents of the distributed register. Changes to the distributed register (e.g., addition of data records) may require consensus to be reached by the nodes in order to become a part of the authentic version of the distributed register. In this way, the consensus mechanism may ensure that each node maintains a copy of the distributed register that is consistent with the copies of the distributed register hosted on the other nodes; if the copy of the distributed register hosted on one node becomes corrupted or compromised, the remaining nodes may use the consensus algorithm to determine the "true" version of the distributed register. The nodes may use various different mechanisms or algorithms to obtain consensus, such as proof-of-work ("PoW"), proof-of-stake ("PoS"), practical byzantine fault tolerance ("PBFT"), or the like.

A "resource" as used herein may refer to funds in a financial account of any denomination or currency type (e.g., dollars, euros, denominations of cryptocurrency, or the like). As such, a "resource account" may refer to an account managed by a financial institution or entity described herein where resources are stored. Resource accounts may be stored, managed, tracked, and maintained by financial institutions or entities, whereas the ownership rights associated with resources in the resource accounts may belong to one or more users or other entities. An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. "Resource tracking data" as used herein may refer resource status data, metadata (e.g., temporal data, location data, ownership data, resource transfer channel data, account numbers, identified patterns, or the like).

Each resource or resource component within the resource account may be assessed using one or more assessment or tracking parameters. In some embodiments, the resource assessments and tracking may be conducted by a user within the entity system. In other embodiments, the resource assessments and tracking may be conducted automatically by one or more computing systems within the entity system. Once an assessment of a resource or resource account has been performed, the results of the assessment may be submitted (e.g., as a pending data record) to be stored within an entry in the distributed register.

In some embodiments, a pending data record may be evaluated for validity via a consensus algorithm, where the consensus algorithm may require that a plurality of computing systems transmit approvals of the proposed data record to one another before the proposed data record is added to the distributed register. In an exemplary embodiment, data may be assessed according to a number of assessment parameters, where the assessment parameters indicate various permissions, geographic locations, resource amounts, ownership, contract terms or the like. In some embodiments, one or more users may manually review the data and transmit approvals. In other embodiments, the review of the data, and transmission of approvals, may be conducted automatically by the computing systems (e.g., nodes) within the entity system.

Once data have been stored in an entry within the distributed register, the data stored therein within the distributed register may be treated by the entity as a single "true" source of application data. That said, over time, conditions may change such that an entity may wish to perform new or updated assessments. For example, new resources may be added to a resource account, applications may be updated or contain new information, or the assessment parameters may change such that certain data is no longer relevant, or new parameters are tracked. In another example, there may be new developments in regulations or policies that necessitate a reassessment of resources within the inventory of the entity system or an outside entity system (e.g., a prime rate of interest may change in a certain location, taxable resources may increase or decrease, or the like).

The system may comprise one or more "interjectors." "Interjector" as used herein may refer to a set of executable program code which may, based on detecting the occurrence of a particular condition, trigger a change in one or more assessment parameters with respect to a certain resource. In an exemplary embodiment, a "service" or "threshold" interjector may detect the existence of a certain resource or resource component threshold being met. In some embodiments, the interjector may detect the existence of said condition based on receiving manual input by a user within the entity's systems. In other embodiments, the interjector may detect the existence of said condition automatically, such as by communicating with a resource, database, or entity system over a network. Upon detecting the occurrence of a particular condition, the interjector may trigger the addition or change in one or more assessment parameters by prompting a user to reassess the resource or by automatically prompting a computing system to perform the reassessment. In some embodiments, the interjectors may be stored and/or executed on computing systems separate from the distributed register nodes. In other embodiments, the interjectors may be stored as smart contract logic as a feature of the distributed register. Using interjectors in this way helps alleviate the efficiency burden (e.g., computing efficiency) of performing repeated or duplicate assessments unnecessarily, as there is no need to reassess an resource; until the interjector triggers such a reassessment, the current state of the distributed register may be taken as the single source of "truth."

The system may further comprise a user interface through which a user may interact with the system or distributed register. The user interface may comprise graphical elements that allow the user to define, add, and/or update applications, resource assessments, and/or assessment parameters within the distributed register, or query and receive information regarding dynamic assessment of intelligent path selection. The user interface may further comprise notification functions which may display alert messages and/or play audible alerts. For instance, an interjector may prompt the user to define an additional assessment parameter by displaying a notification message via a notification window. The user interface may further be configured to allow the user to add, edit, or configure the various interjectors and/or their associated conditions or triggers. In this regard, embodiments of the present disclosure provide a system, computer program product, and method for using a distributed register to conduct, manage, and store application data and resource data. In particular, the entity system may comprise a resource account tool or resource application wherein a user may deposit or withdraw resources, create new accounts, generate smart contracts based on available resources, or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed register, where the self-executing code may be executed when the condition precedent is detected by the system on which the smart contract is stored. In other embodiments, the resource information related to the smart contract may be related to a resource agreement (e.g., single provisions, multiple provisions, or an entire resource agreement) in which two or more entities have agreed to terms with respect to a resource amount or resource account. As such, the resource agreement may be related to storage, access, and/or dissemination of resources or portions thereof according to validated terms of the smart contract.

The system as disclosed herein addresses a number of technology-centric challenges associated with tracking resources and managing resource account data. By using a distributed register with interjectors as described herein, the system may reduce the occurrence of inconsistent data, duplicative assessments, uncertainty about a resources amount, access, ownership, location, and/or compliance with regulations or policies, or the like. In turn, the computing efficiency associated with performing application assessments within the entity system may be greatly increased. Furthermore, storing assessment and tracking data within a distributed register helps ensure the integrity and security of the data, thereby reducing the likelihood of data loss through corruption and/or tampering.

Figure 1:
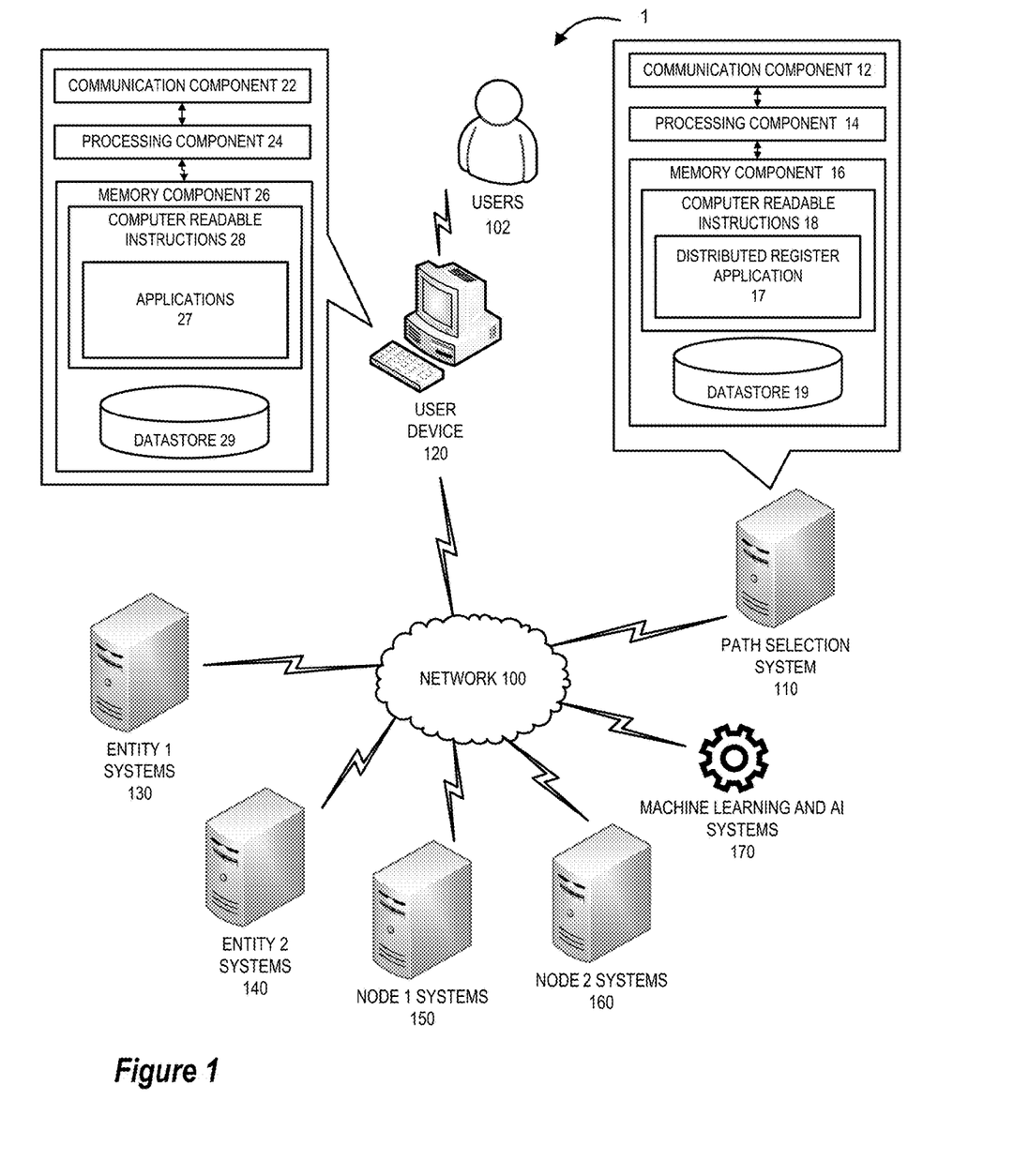
FIG. 1 illustrates a path selection system environment 1, in accordance with embodiments of the present disclosure.

FIG. 1 illustrates a path selection system environment 1, in accordance with embodiments of the invention. As illustrated in FIG. 1, path selection system 110 are operatively coupled, via a network 100, to one or more user device(s) 120, entity 1 systems 130, entity 2 systems 140, node 1 system 150 (e.g., a first database or distributed register node), node 2 system 160, machine learning and AI systems 170, or other like systems. It should be understood that the path selection system 110 may comprise the systems that are utilized to manage the path selection system environment 1. It should be further understood that the nodes of a distributed computing network 200, further described with regard to FIG. 2, may comprise both path selection system 110, one or more node systems, and user devices 120. The user devices 120, or a portion thereof, may also be nodes of the distributed computing network 200 (e.g., may be a system of the path selection system 110). Alternatively, or additionally, the user devices 120 may be associated with individual entities (e.g., entity 1, entity 2, which may be companies, individual users, or the like), or may be part of an entity system 130 or 140. The user devices 120 may access nodes of the path selection system 110 on behalf of an entity (e.g., organizations, individual users, or the like). Furthermore, the entity systems 130, 140, or a portion thereof, may be nodes of the path selection system 110. Alternatively, or additionally, the user devices 120 and/or the organization systems 130, 140, may not be nodes (e.g., not a part of the path selection system 110, and instead are used merely to operate the organization systems and/or access the path selection system 110).

Figure 2:
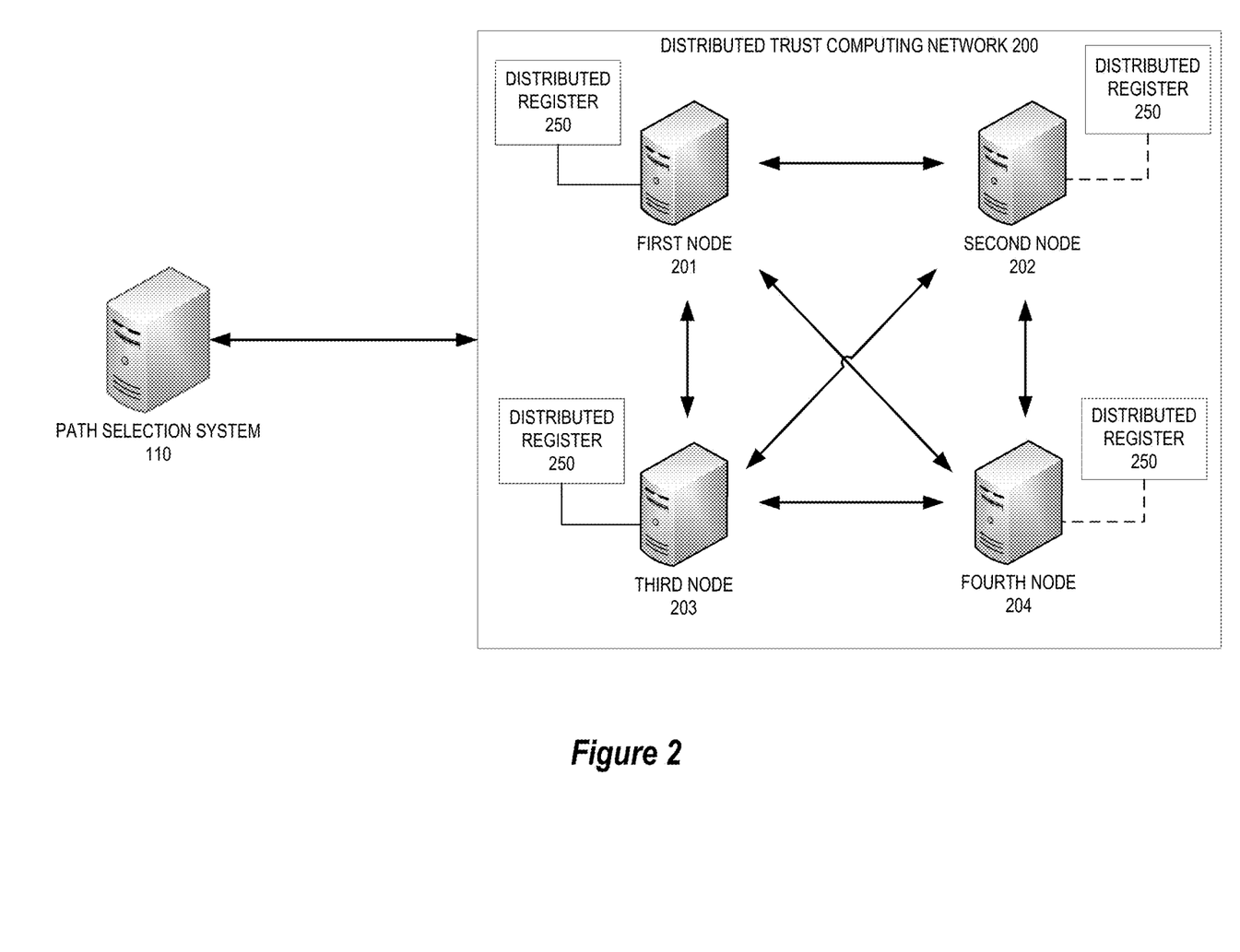
FIG. 2 is a block diagram illustrating an operating environment for a distributed trust computing network, in accordance with some embodiments of the present disclosure.

Consequently, the path selection system 110 may be separate systems that are nodes for distributed computing network 200 and/or in some embodiments may include the user devices 120 and/or organization systems 130, 140, or a portion thereof as nodes. As such, regardless of whether or not the user devices 120 are nodes, the users 102 may utilize the user devices 120 to access, store, distribute, or the like resource information related to resources on a distributed register, as will be described in further detail herein. In some embodiments, the path selection system 110 may be private distributed register systems, public distributed register systems, or hybrid distributed register systems (public and private distributed register systems), which will be described in further detail herein.

The environment 1 may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the path selection system 110 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 100 and other components on the network 100, such as, but not limited to, the user devices 120, the entity 1 systems 130, the entity 2 systems 140, the node 1 system 150, node 2 system 160, or other like systems. As such, the one or more communication components 12 generally comprise a wireless transceiver, modem, server, electrical connection, electrical circuit, or other component for electronically communicating with other components on the network 100. The one or more communication components 12 may further include an interface that accepts one or more network interface cards, ports for connection of network components, Universal Serial Bus (USB) connectors or the like.

As further illustrated in FIG. 1, the path selection system 110 comprise computer-readable instructions 18 stored in the memory component 16, which in one embodiment includes the computer-readable instructions 18 of the distributed register applications 17. In some embodiments, the one or more memory components 16 include a data repository 19 for storing data related to the path selection system 110, including, but not limited to, data created, accessed, and/or used by the distributed register application 17. It should be understood that the path selection system 110, and the components therein, may be one or more private distributed registers, one or more public distributed registers, and/or one or more hybrid distributed registers.

The path selection system 110 and distributed register application 17, as will be described in further detail herein, may allow for resource account management (e.g., resource balance assessment, resource deposits, pooled deposits, resource account creation, or the like), tracking of resource account events (e.g., resource transfers, earned interest, or the like), resource agreements (e.g., smart contracts, or the like), and for the determination of resource suggestions (e.g., recommended resource transfers, deposits, investments, or the like) based on resource performance and resource thresholds. As explained in further detail later, the distributed register systems 10 may be located in or associated with the other systems described herein.

As illustrated in FIG. 1, users 102 may access the distributed register application 17 on the one or more distributed systems 10, or a portion thereof stored on other systems (e.g., a portion of the distributed application 17 stored on other user devices 20 or on the entity systems 130, 140), or through other applications, through the user devices 120. The user device 120 may be a desktop, laptop, tablet, mobile device (e.g., smartphone device, or other mobile device), or any other type of computer that generally comprises one or more communication components 22, one or more processing components 24, and one or more memory components 26. In some embodiments the user device 120 may contain a locally stored resource wallet that provides data to the path selection system 110 or one or more entity systems 130, 140 (e.g., an electronic currency wallet, or the like). In other embodiments, the user device may be a smart home device designed to interface with the user to accept auditory commands in the natural language of the user and forward such data to the resource accounts systems 110 for further language processing. In such embodiments, various services provided by the resource account systems may be provided to the user via the smart home device (e.g., resource account balance request, initiation of resource transfers between one or more accounts, or the like).

The one or more processing components 24 are operatively coupled to the one or more communication components 22, and the one or more memory components 26. The one or more processing components 24 use the one or more communication components 22 to communicate with the network 100 and other components on the network 100, such as, but not limited to, the path selection system 110, the entity 1 systems 130, the entity 2 systems 140, the node 1 system 150, node 2 system 160, or other systems. As such, the one or more communication components 22 generally comprise a wireless transceiver, modem, server, electrical connection, or other component for communicating with other components on the network 100. The one or more communication components 12 may further include an interface that accepts one or more network interface cards, ports for connection of network components, Universal Serial Bus (USB) connectors or the like. Moreover, the one or more communication components 22 may include a keypad, keyboard, touch-screen, touchpad, microphone, mouse, joystick, other pointer component, button, soft key, and/or other input/output component(s) for communicating with the users 102.

As illustrated in FIG. 1, the user devices 120 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. As previously discussed, the distributed register application 17, or a portion thereof, may be stored on one or more of the user device(s) 120. In some embodiments, data may be provided to the user device or one or more entity systems from the resource accounts systems 110 using application programming interface (API) language in order to securely receive and respond to requests for various data.

In some embodiments the user device 120 may be operatively coupled to a resource in order to become a resource system (e.g., capture information from the resource and transfer the information). For example, the user device 120 may connect to the resource through a wire or communicate wirelessly with the resource. As such, in some embodiments the resource may communicate directly with other systems over the network 100. Consequently, in some embodiments the resource system may be a node within the resource account system environment 1.

As illustrated in FIG. 1, the entity 1 systems 130, the entity 2 systems 140, the node 1 system 150, node 2 system 160, or other systems are operatively coupled to the path selection system 110 and/or user devices 120, through the network 100. These systems have components that are the same as or similar to the components described with respect to the path selection system 110 and/or user devices 120 (e.g., one or more communication components, one or more processing components, and one or more memory devices with computer-readable instructions of one or more applications, one or more datastores, or the like). Thus, the entity 1 systems 130, the entity 2 systems 140, the node 1 system 150, node 2 system 160, or other systems communicate with the path selection system 110, the user devices 120, and/or each other in same or similar way as previously described with respect to the path selection system 110 and/or the user devices 120. The entity systems 130, 140, may be made up of one or more user devices 120, one or more of the path selection system 110, or portions of any of the foregoing systems, and as such may act as nodes (explained in further detail with respect to FIG. 2) which are utilized to store, allow access to, disseminate, validate, or the like resource information.

FIG. 2 is a block diagram illustrating an operating environment for the distributed trust computing network 200, in accordance with some embodiments of the present disclosure. In particular, the operating environment may include a plurality of distributed register nodes 201, 202, 203, 204 in operative communication with one another within the distributed trust computing network 200. The distributed trust computing network 200, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 201, the second distributed register node 202, the third distributed register node 203, and the fourth distributed register node 204 may be computing systems which host the distributed register 250. In some embodiments, the distributed register 250 may comprise the data for all resources within the entity system. Accordingly, the distributed register nodes 201, 202, 203, 204 are typically networked terminals or servers, but may also be desktop computers, laptops, smartphones or smart devices, IoT devices, or the like, or any combination thereof. Typically, each distributed register node 201, 202, 203, 204 hosts a complete copy of the distributed register 250. The contents of the various copies of the distributed register 250 hosted on the distributed register nodes 201, 202, 203, 204 may be updated to be consistent with one another via a consensus algorithm executed by the distributed register nodes 201, 202, 203, 204. In this way, a complete and verified copy of the distributed register 250 may remain accessible even if the copy of the distributed register 250 stored on one or more distributed register nodes 201, 202, 203, 204 become inaccessible (e.g., due to being offline, experiencing high network latency, or the like) or corrupted (e.g., due to hardware/software errors, unauthorized modification of distributed register contents, or the like).

The operating environment may further comprise a path selection system 110 which may be in operative communication with the distributed register nodes 201, 202, 203, 204 of the distributed trust computing network 200 via node 2 system 160. The path selection system 110 may be a computing system that submits resource account data to the nodes 201, 202, 203, 204 in the form of proposed data records to be added to the distributed register 250. The path selection system 110 may further be used to manage interjectors and receive notifications regarding the account data within the distributed register 250. Accordingly, the path selection system 110 may be a desktop computer, laptop computer, smartphone, tablet, smart device, IoT device, single board computer, or the like. In some embodiments, path selection system 110 may be operated by a user within the entity. In other embodiments, the path selection system 110 may automatically perform various functions to manage account data and/or interjectors.

The submission and receipt of data between path selection system 110 and the distributed trust computing network 200 may be achieved through one or more nodes described in FIG. 1 (e.g., the node 1 system 150, the node 2 system 160, or the like) and immediately processed for submission to the distributed register, such that that data hops or manual data touchpoints are reduced to preferably zero, allowing the system to maintain maximum integrity of data validation. The automated flow of permissioned ledger data allows the leveraging of distributed register technology and distributed register based services directly to client side systems. The path selection system 110 may be designed to provide a catalog of services to client side systems. For instance, the service catalog may comprise user relationship management services, resource planning services, product lifecycle management services, and entity relationship management services, which are able to be accessed by client side systems to store, and retrieve data from a permissioned distributed register system via one or more nodes.

It should be understood by those having ordinary skill in the art that although the distributed register nodes 201, 202, 203, 204, and/or the path selection system 110 are depicted as single units, each of the depicted components, or subcomponents therein, may represent multiple units. In some embodiments, a given computing system as depicted in FIG. 2 may represent multiple systems configured to operate in a distributed fashion. In other embodiments, the functions of multiple computing systems may be accomplished by a single system. For instance, the functions of the path selection system 110 may be accomplished by one or more of the distributed register nodes 201, 202, 203, 204. It should further be understood that even though reference may be made to a single "distributed trust computing network 200," all singular usages of "distributed trust computing network" or "distributed register" may also refer to multiple distributed registers. For instance, separate distributed registers may be stored on the nodes 201, 202, 203, 204 on a per-application or per-parameter basis.

Figure 3:
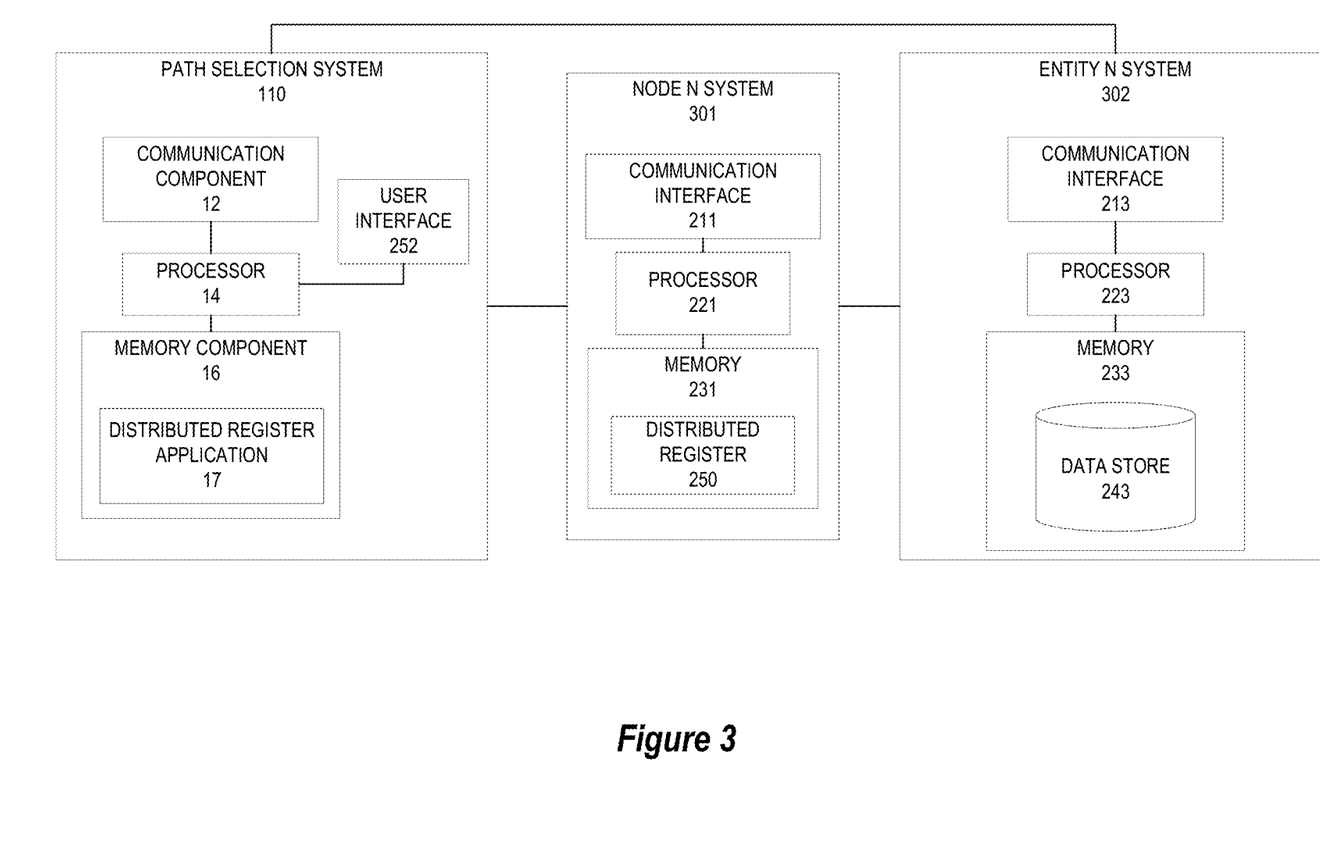
FIG. 3 is a block diagram illustrating the data flow between the structures of the path selection system, one or more nodes, and one or more entity systems, in accordance with some embodiments of the present disclosure.

FIG. 3 is a block diagram illustrating the data flow between the structures of the path selection system, one or more nodes, and one or more entity systems, in accordance with some embodiments of the present disclosure. The node N system 301 may comprise a processor 221 communicably coupled to such devices as a communication interface 211 and a memory 231. It should be understood that the node N system 301 as depicted in FIG. 3 may represent any or all of the distributed register nodes 201, 202, 203, 204 as depicted in FIG. 2, or one or more of node 1 systems 150 or node 2 systems 160 as depicted in FIG. 1. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The node N system 301 may use the communication interface 211 to communicate with other devices over the distributed trust computing network 200 or over network 100. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the node N system 301 may comprise a copy of the distributed register 250. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory, solid state memory, or the like. In some embodiments, the memory 231 of the node N system 301 may further comprise smart contract logic for one or more interjectors.

Typically, the node N system 301, along with any or all nodes within the distributed trust computing network 200, maintain a complete copy of the distributed register 250. The node N system 301 may be configured to communicate with the other nodes to determine the contents of the distributed register 250 stored thereon. For instance, the nodes within the distributed trust computing network 200 may use one or more consensus algorithms (e.g., Proof-of-Work, Proof-of-Stake, Practical Byzantine Fault Tolerance, or the like) to add proposed data records to each of the individual copies of the distributed register 250. In other embodiments, the nodes 201, 202, 203, and 204 may execute smart contract logic to add proposed data records.

As discussed in FIG. 1, the path selection system 110 may also comprise a processor 14 communicatively coupled with such devices as a communication component 12 and a memory component 16. Typically, the path selection system 110 interacts with the node N system 301 to access the distributed register 250 therein. Accordingly, the path selection system 110 may be a desktop computer, networked terminal, laptop computer, tablet, smartphone, or the like. In embodiments in which the path selection system 110 is operated by a user, the assessments computing system 110 may be configured to interface with the user, who may use the path selection system 110 to access the access, view, and/or submit proposed data records within the distributed register 250. The path selection system 110 may further be used to manage the distributed register interjectors. In this regard, the path selection system 110 may further comprise a user interface 252, which may comprise the hardware and software implements to accept input from and provide output to the user. The user interface 252 may comprise hardware such as a display, audio output devices, projectors, or the like, or input devices such as keyboards, mice, sensors, cameras, microphones, biometric input devices (e.g., fingerprint readers), or the like. The user interface 252 may further comprise software such as a graphical or command-line interface through which the user may provide inputs and/or receive outputs from the path selection system 110. It should be understood that the display on which the user interface 252 is presented may include an integrated display (e.g. a tablet or smartphone screen) within the path selection system 110, or an external display device (e.g. a computer monitor or television).

The memory component 16 of the path selection system 110 may comprise a distributed register application 17 stored thereon. The distributed register application 17 may include software that allows the path selection system 110 to submit proposed data records to the distributed register 250, where the proposed data records comprise resource account data or pooled resource account data. In some embodiments, the path selection system 110 may automatically submit resource account data to the distributed register 250. In such embodiments, the distributed register application 17 may be configured to upload data to the node N system 301 upon being prompted by a distributed register interjector. In other embodiments, a user may use the path selection system 110 to upload data and/or participate in consensus to validate proposed data records via a selected path or specific node on distributed trust computing network 200. In such embodiments, the distributed register application 17 may include an entity-provided application or other third party application which interfaces with the user to allow the user to intelligently select and communicate with the node N system 301. For instance, in some embodiments, the distributed register application 17 may include a web browser, web portal, API interface, or the like which allows the user to access a web server to upload data, send or receive data, participate in validation of data records, manage distributed register interjectors, or the like. In certain embodiments, the distributed register application 17 may further comprise distributed register interjectors which prompt the addition or update of data within the distributed register 250.

The node N system 301 and/or the path selection system 110 may further be in operative communication with one or more entity systems, such as entity system N 302. The entity N system 302 may comprise a communication interface 213, a processor 223, and a memory 233 having a data store 243 stored thereon. The data store 243 may comprise the types of data needed by the path selection system 110 to perform data path selection management or data storage management. For example, the data store 243 may comprise a continuously updated list of application information, latency requirements, data schema, historical processing times, transaction types, backup configurations, or may comprise a continuously updated list of entity policies. Based on the data store 243, the path selection system 110 may define new parameters or update existing parameters for specific applications or data sets.

Figure 4:
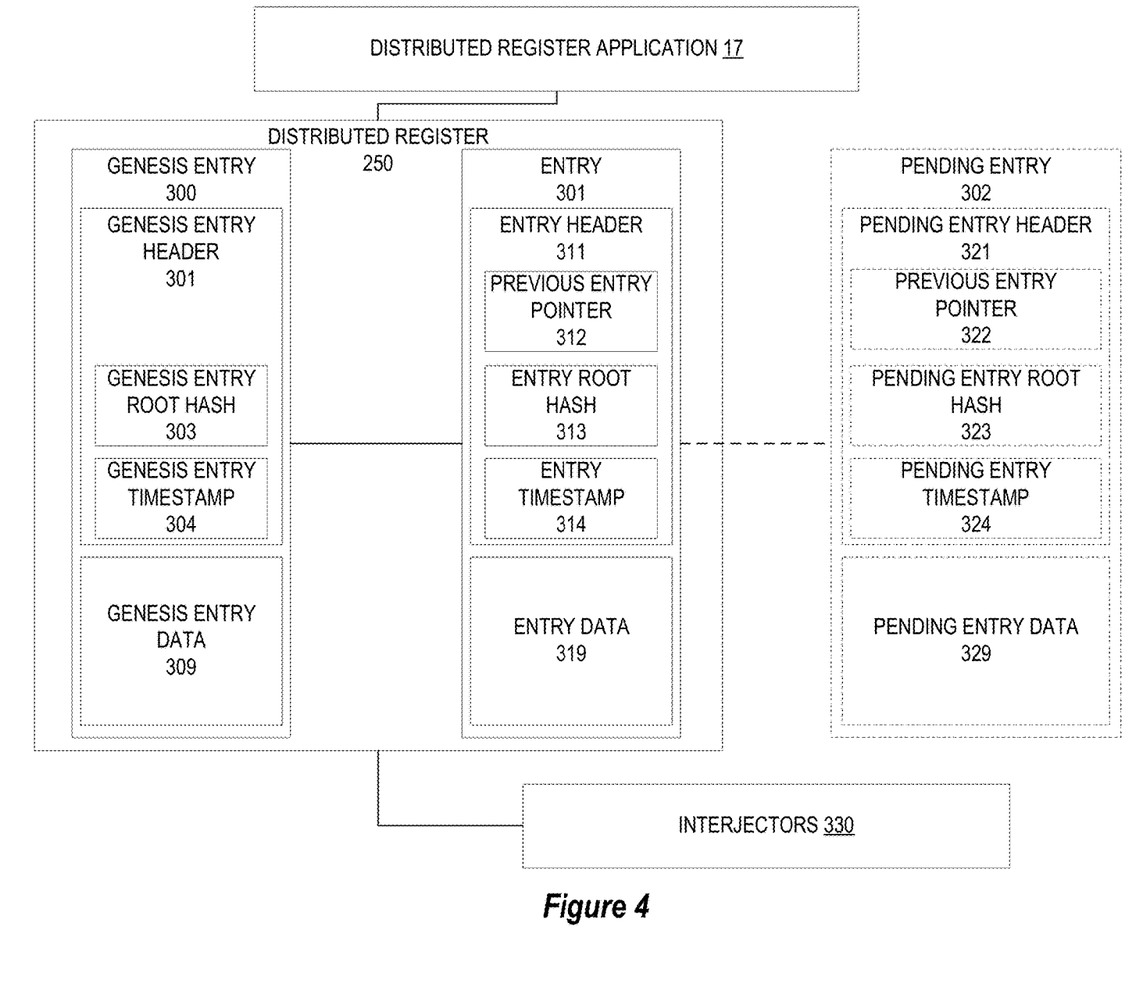
FIG. 4 is a block diagram illustrating the data structures within a distributed register, in accordance with some embodiments of the present disclosure.

FIG. 4 is a block diagram illustrating the data structures within the distributed register 250, in accordance with some embodiments. In particular, FIG. 4 depicts a plurality of entries 300, 301 within the distributed register 250, in addition to a proposed entry 302 that has been submitted to be appended to the distributed register 250. The distributed register 250 may comprise a genesis entry 300 that serves as the first entry and origin for subsequent entries in the distributed register 250. The genesis entry 300, like all other entries within the distributed register 250, comprise entry header 301 and entry data 309. The genesis entry data 309, or any other instances of entry data any entries in the distributed register 250 may contain various data records.

The genesis entry header 301 may comprise various types of metadata regarding the genesis entry data 309. In some embodiments, the entry header 311 may comprise a genesis entry root hash 303, which is a hash derived from an algorithm using the genesis entry data 309 as inputs. In some embodiments, the genesis root hash 303 may be a Merkle root hash, wherein the genesis entry root hash 303 is calculated via a hash algorithm based on a combination of the hashes of each data record within the genesis entry data 309. In this way, any changes to the data within the genesis entry data 309 will result in a change in the genesis entry root hash 303. The genesis entry header 301 may further comprise a genesis entry timestamp 304 that indicates the time at which the entry was written to the distributed register 250. In some embodiments, the timestamp may be a Unix timestamp. In some embodiments, particularly in distributed registers utilizing a PoW consensus mechanism, the entry header 301 may comprise a nonce value and a difficulty value. The nonce value may be a whole number value that, when combined with a hash of the other items of metadata within the entry header 301, produces a hash output that satisfies the difficulty level of the cryptographic puzzle as defined by the difficulty value. For instance, the consensus mechanism may require that the resulting hash of the entry header 301 falls below a certain value threshold (e.g., the hash value must start with a certain number of zeroes, as defined by the difficulty value).

A subsequent entry 301 may be appended to the genesis entry 300 to serve as the next entry in the distributed register. Like all other entries, the entry 300 comprises an entry header 311 and entry data 319. Similarly, the entry header 311 comprise an entry root hash 313 of the data within the entry data 319 and an entry timestamp 314. The entry header 311 may further comprise a previous entry pointer 312, which may be a hash calculated by combining the hashes of the metadata (e.g., the genesis entry root hash 303, genesis entry timestamp 304, or the like) within the entry header 301 of the genesis entry 300. In this way, the entry pointer 312 may be used to identify the previous entry (i.e., the genesis entry 300) in the distributed register 250, thereby creating a "chain" comprising the genesis entry 300 and the entry 301.

The value of a previous entry pointer is dependent on the hashes of the entry headers of all of the previous entries in the chain; if the entry data within any of the entries is altered, the entry header for the altered entry as well as all subsequent entries will result in different hash values. In other words, the hash in the entry header may not match the hash of the values within the entry data, which may cause subsequent validation checks to fail. Even if an unauthorized user were to change the entry header hash to reflect the altered entry data, this would in turn change the hash values of the previous entry pointers of the next entry in the sequence. Therefore, an unauthorized user who wishes to alter a data record within a particular entry must also alter the hashes of all of the subsequent entries in the chain in order for the altered copy of the distributed register to pass the validation checks imposed by the consensus algorithm. Thus, the computational impracticability of altering data records in a distributed register in turn greatly reduces the potential of improper alteration of data records.

A pending entry 302 or "proposed entry" may be submitted for addition to the distributed register 250. The pending entry 302 may comprise a pending entry header 321, which may comprise a pending entry root hash 323, a previous entry pointer 322 that points to the previous entry 301, a pending entry timestamp 324, and pending entry data 329. Once a pending entry 302 is submitted to the system, the nodes within the system may validate the pending entry 302 via a consensus algorithm. The consensus algorithm may be, for instance, a proof of work mechanism, in which a node determines a nonce value that, when combined with a hash of the entry header 311 of the last entry in the distributed register, produces a hash value that falls under a specified threshold value. For instance, the PoW algorithm may require that said hash value begins with a certain number of zeroes. Once said nonce value is determined by one of the nodes in the distributed register, the node may post the "solution" to the other nodes in the distributed register. Once the solution is validated by the other nodes, the hash of the entry header 311 is included in the pending entry header 321 of the pending entry 302 as the previous entry pointer 322. The pending entry header 321 may further comprise the pending entry root hash 323 of the pending entry data 329 which may be calculated based on the winning solution. The pending entry 302 is subsequently considered to be appended to the previous entry 301 and becomes a part of the distributed register 250. A pending entry timestamp 324 may also be added to signify the time at which the pending entry 302 is added to the distributed register 250. In other embodiments, the consensus mechanism may be based on a total number of confirmations submitted by the nodes of the distributed register 250 (e.g., a PBFT consensus mechanism). Once a threshold number of confirmations to validate the pending entry 302 has been reached, the pending entry 302 may be appended to the distributed register 250. In such embodiments, nonce values and difficulty values may be absent from the entry headers.

The system described herein may use one of several different paradigms for entry creation. In some embodiments, an entry may be generated whenever new assessment parameters or applications are defined. In some embodiments, the system may wait to receive inputs for all known assessment parameters for all applications before generating an entry. In other embodiments, entries may be generated on a per-application basis. In yet other embodiments, new entries may be generated for each transaction that is processed or routed by the path selection system 110. Other possibilities exist, as the entity may select its entry generation methods based on striking a balance between computing efficiency and detailed record keeping over a period of time.

The resource account system, via the distributed register application 17, may submit a proposed data record to the distributed register 250, where the proposed data record may comprise a new or updated assessment parameter, resource data, new or updated metadata regarding a resource, or the like. In this way, the distributed register application 17 may be used to manage data, account parameters, assessment data, or the like. Furthermore, because such data is added in time-stamped entries to the distributed register, the system is able to reliably and accurately recreate the state of the resources) within the entity system at any particular point in time.

The data records may comprise resource account data, application data, or resource agreement data associated with one or more applications or users within the system. In particular, each account within the entity system may be assigned an identifier (e.g., a character string, hash value, numerical identifier, or the like). For instance, in some embodiments, applications may be labeled in numerical order (e.g., account 1, account 2, or the like). In other embodiments, the accounts may be logged according to an existing resource identifier, such as an account number, user identifier, pin code, wallet address, routing number, combination of identifiers, or the like. In further embodiments, an existing account number may be logged as associated with a separate account identifier that is used to log data in the distributed register (e.g., account number 1 associated with user 1, or account number 1 associated with application 1, or the like). The parameters used to log each account may also each be assigned a parameter identifier. For instance, the parameters may be numbered (e.g., Parameter 1, Parameter 2, or the like). Parameters may include, but are not limited to, tracking each particular account's amount, application's needs, application's compatibilities, ownership information, security information, managing entity information, jurisdiction, or the like.

In any embodiment, the path selection system 110 may, via the distributed register application 17, participate in validating proposed data records through a consensus algorithm, along with the nodes of the distributed register 250. For example, a new parameter which coincides with a newly created application update may be proposed to be added to the distributed register 250. In such embodiments, the path selection system 110 may be used to verify that the new application update adequately and accurately reflects the code in the component applications. The path selection system 110 may further ensure that the data to be entered possesses certain latency requirements, data file type requirements, or historical processing time, or the like. For instance, the system may receive data from data sources on a periodic basis that is not relatively time-sensitive and does not possess any specific latency requirements (e.g., path selection system 110 may ping one or more entity systems to receive an updated resource account balance once per day). If the required parameters are missing or cannot be corroborated from the received data, the path selection system 110 may either reject the proposed data record containing the data or delay validating the proposed data record until the missing inputs are provided. In other embodiments, the system may receive data from data sources on a periodic basis that is relatively time-sensitive and does possess specific latency requirements (e.g., path selection system 110 may ping one or more entity systems to receive real time market value of resources, or the like).

In this case, the path selection system 110 may prioritize the data path of a node with the lowest latency for this specific data.

In some embodiments, the distributed register application 17 of the path selection system 110 may be used to define an initial set of parameters within the entry data (e.g., the genesis entry data 309) of an entry (e.g., the genesis entry 300) for each resource in the entity system. In such embodiments, when the path selection system 110 submits proposed data records to be appended to the distributed register 250 in subsequent entries, the consensus algorithm may require that a parameter and resource has been defined in one of the previous entries in order for the proposed data record to be considered valid. For instance, if a proposed data record comprises an assessment for Resource Parameter 1 with respect to Resource 1, the system may first verify that the Resource Parameter 1 and Resource 1 have been defined in a previous entry (e.g., the genesis entry 300). If the definitions of the parameter and resource are not found, the proposed data record may be considered to be invalid. It should be noted that while parameters may be defined in the genesis entry 300, it is within the scope of the disclosure for new or updated parameters and/or resources to be defined in any entry within the distributed register 250.

Over time, it may become necessary to adjust these processes in response to changes in the operating environment, entity requirements, technical advances, new security threats, changes in policies, or the like. In this regard, the system may use one or more interjectors 330 to cause a new entry to be created which contains the new tracking parameters, data, and/or metadata. "Interjector" may generally refer to the hardware and software implements that trigger the addition or updating of data within a new entry (e.g., the pending entry 302). In some embodiments, the interjector may be stored on the path selection system 110. In other embodiments, the interjectors may be executed as smart contracts by the nodes of the distributed register 250.

An interjector 330 may detect the existence of a condition that requires a change in the metadata, transaction data, or other type of data within the distributed register 250. For example, the "condition" may be the emergence of a new type of computer virus or security vulnerability which necessitates the evaluation of particular applications to assess their vulnerability to the virus or malfeasant code. Upon detecting the condition, the interjector 330 may trigger the addition of new data records to the distributed register 250 via the distributed register application 17. In some embodiments, the system may recognize that further data is required in order to maintain integrity, and may automatically request such data from one or more entities or users.

In embodiments in which the new data records are added manually, the interjector 330 may send an alert or notification to the user through the path selection system 110, where the alert or notification prompts the user to enter the necessary information (e.g., a renewed assessment, a new account parameter, or the like). The alert or notification may comprise a link (e.g., a hyperlink, or the like) that, when activated, opens a graphical interface on path selection system 110 (e.g., a web browser pointing to a web server) which provides graphical elements that allow the user to input the necessary information (e.g., resource data). Once the user submits the necessary information, the path selection system 110 may submit a proposed data record to the distributed register 250, where the proposed data record contains the information provided by the user to be incorporated into the distributed register 250. In embodiments in which the new data records are added automatically, the interjector 330 may cause the path selection system 110 to automatically retrieve resource data and submit the necessary information to the distributed register 250 in the form of a proposed data record.

Various types of interjectors 330 may be used to trigger the addition of data records to the distributed register. For example, the interjectors 330 may include a "recall or vulnerability interjector" that triggers inputs of assessment data relating to a new defect or vulnerability affecting a resource, a "reassessment clock interjector" or "periodic interjector" which triggers reassessments after a threshold period of time has elapsed since a resource has last been assessed (e.g., periodically retrieving application data, or the like), a "circumstance interjector" which triggers assessments based on the occurrence of certain incidents, events, or problems, or the like. It should be understood that the interjectors 330 described above are provided for exemplary purposes only, and that other types of interjectors 330 and/or triggers may be used depending on the entity's needs.

Figure 5:
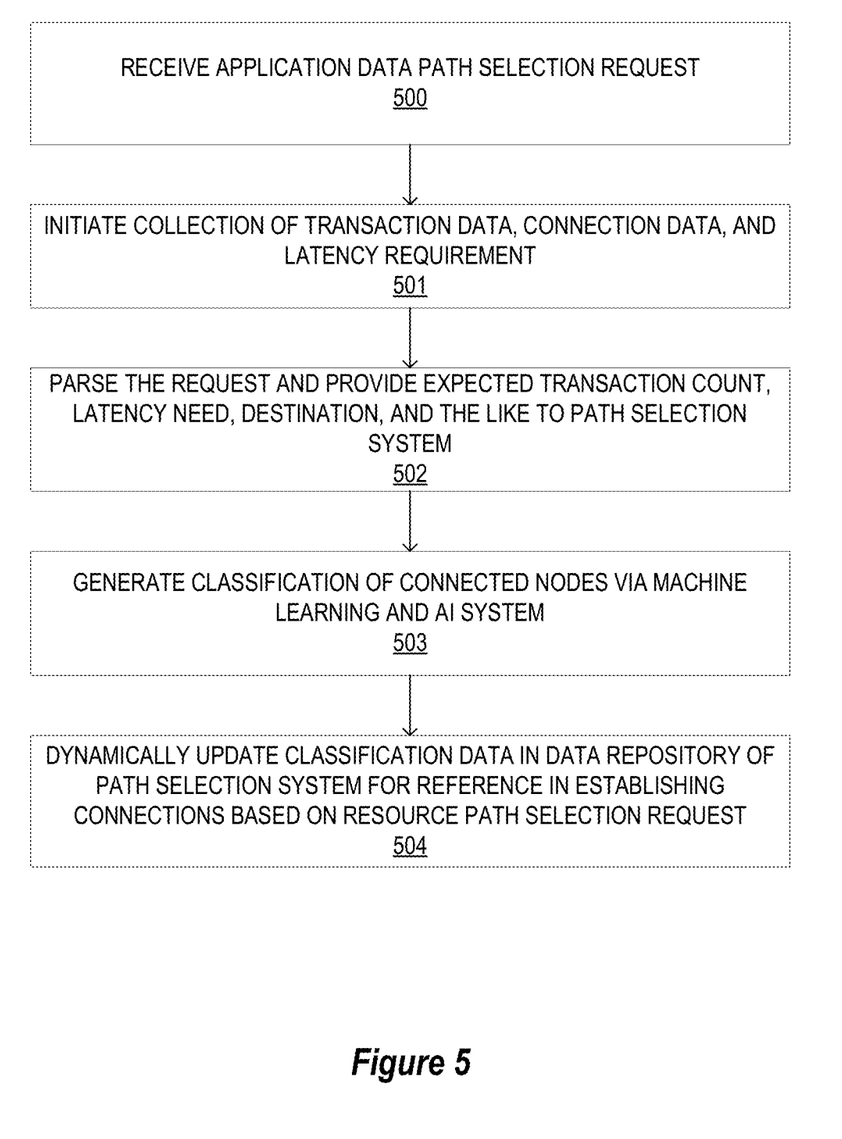
FIG. 5 is a process flow for the path selection system, in accordance with some embodiments of the present disclosure.

FIG. 5 is a process flow for intelligent path selection using the path selection system, in accordance with some embodiments of the present disclosure. The process begins at block 500, wherein the path selection system receives an application data path selection request, which may be either a read request or a write request. In a data write transaction, the data path selection request comprises a request for an optimal data path or node connection such that data may be written to the distributed register 250. In a data read transaction, the data path selection request comprises a request for an optimal data path or node connection for data to be read from the distributed register 250. In some embodiments, the data path selection requests may be submitted by a user via a user device using a web portal, standalone distributed register application 17, application 27, API request, or the like, in which the path selection system may transmit data to the user device in order to transform the display of the user device to convey available information regarding the status of the request or node availability and classification. Data for the data path selection request may be transmitted to the path selection system for storage, or may exist on an external entity system storage. In some embodiments, the path selection system may employ the use of only metadata in selecting an optimal data path for the data transaction, while in other embodiments, the path selection system may receive the data files for the data transaction of the data path request from the user prior to intelligent path selection. Data may be transmitted to the path selection system 110 in a multi-channel or multi modal fashion, wherein a number of different data types (e.g., structured, unstructured, semi-structured, or the like), or connection types (e.g., WAN, LAN, encrypted, or the like) may be utilized. Likewise, the connection for optimal data paths to available nodes may reflect the variability in connection type or data type of the data path request in some embodiments.

Next, the system initiates a collection of transaction data, connection data, and latency requirements for the data path selection request, as shown in block 501. After the system receives this data, the system parses the request for input parameters, connection string, input load, current workload of possible destination nodes, historical execution time of like transactions, and determines node availability, backup node availability, and latency needs for the data path selection request. The system then provides expected transaction count, latency needs, destination, and the like to the path selection system 110, as shown in block 502. Via use of the machine learning and AI system 160, the system generates a classification of connected nodes, as shown in block 503 (e.g., "highly recommend," "can be used," "do not consider," or the like). The system may then update classification data in the data repository 19 of the path selection system 110, as shown in block 504. This data is then used for reference in establishing connections based on the resource path selection request, and executing the data transaction for the data path selection request.

Figure 6:
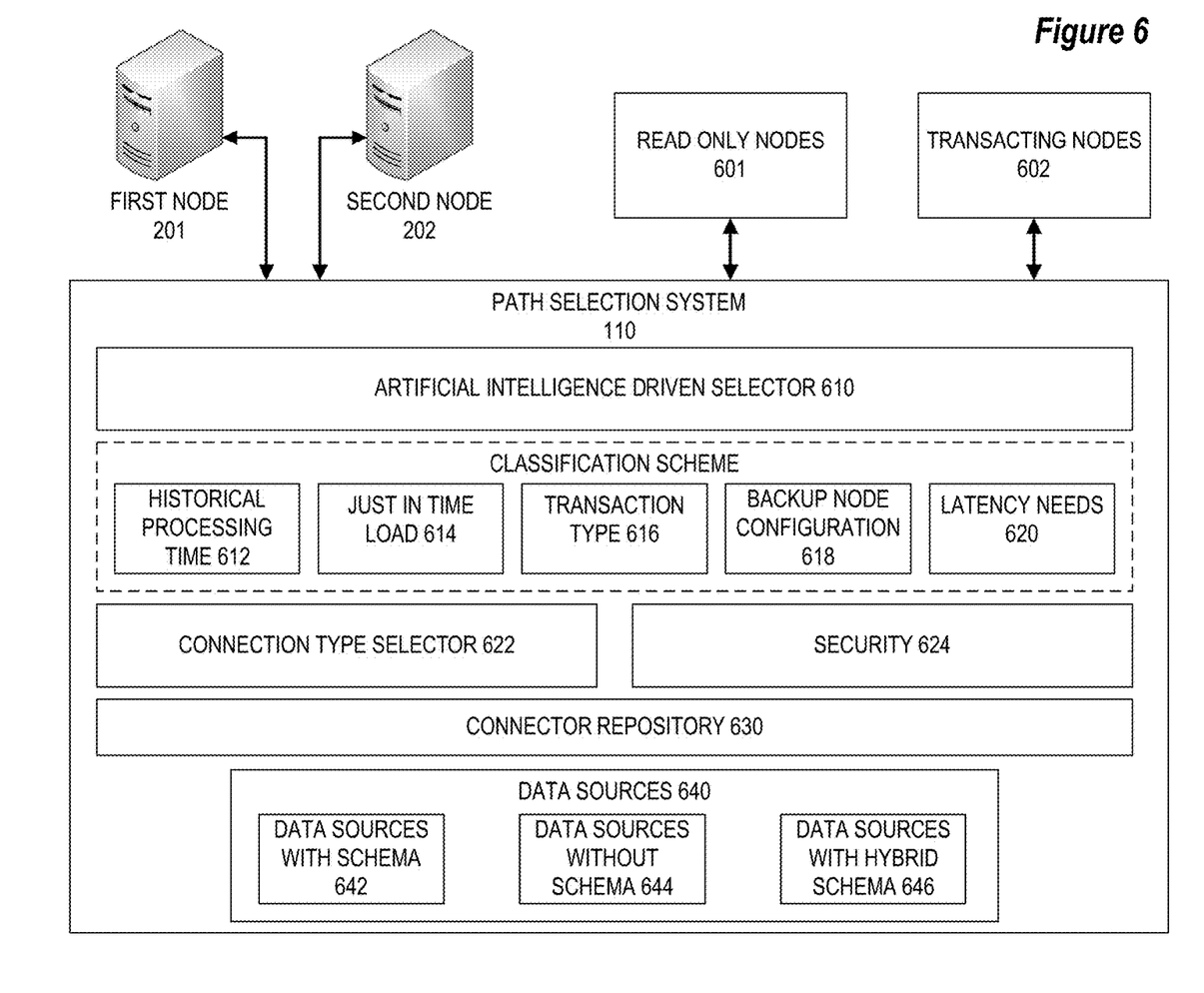
FIG. 6 is block diagram illustrating the data structures for intelligent path selection, in accordance with some embodiments of the present disclosure.

FIG. 6 is block diagram illustrating the data structures for a resource account service data flow, in accordance with some embodiments of the present disclosure. As shown, the diagram in FIG. 6 depicts an embodiment wherein the first node 201, and the second node 202, are operatively connected to share data with the path selection system 110. Also shown in FIG. 6 are read only nodes 601, and transacting nodes 602. As previously described, in embodiments where all nodes are components of a distributed register network, each node may contain an effectively immutable copy of previously validated data as a complete distributed register as it currently stands, but each node may also take on a different purpose depending on the nature of the present situation as may be dictated by the analysis of path selection system 110 and the specific requirements or data characteristics of any given transaction of data. As such, the first node 201 and second node 202 may represent a read only node 601 or a transacting node 602 depending on the given circumstances at any given time, such as bandwidth of the network operatively connecting the nodes to path selection system 110, latency of the network connection, current node data load, hardware optimization characteristics, or the like. It is understood that while the embodiment shown depicts only the first node 201 and the second node 202, any number of nodes may be connected to the path selection system 110, and may be dynamically classified as either read only nodes 601 or transacting nodes 602. In the case depicted in FIG. 6, the entire system may be designed such that one or more users or entities may leverage the capabilities of the path selection system to access path selection system services via a user device, wherein the capabilities provided by the path selection system 110 may be provided as a client service, software as a service, or the like. As such, while not specifically depicted in FIG. 6, the path selection system may receive data from and provide data to users via one or more user devices, and such data may cause the user device to display information regarding intelligent path selection, node status, transaction status, or the like, in real time.

As shown in FIG. 6, the path selection system 110 includes artificial intelligence driven selector 610 ("AI selector"). In some embodiments, the AI selector may be an internal part of the path selection system 110, while in other embodiments, it is understood that the AI selector may utilize or leverage the capabilities of a separate cloud computing or networked AI system via an encrypted data stream, such as the machine learning and AI system 170 depicted in FIG. 1. It is understood that the AI selector may comprise a supervised or unsupervised machine learning model, or ensemble of models, in order to process incoming data and node status criteria in order to classify nodes in a dynamic fashion using a neural network architecture. The AI selector is configured to process a collection of data received by or stored on the system, which provides a wealth of available training data allowing the system to develop a high level of adaptability to constantly changing environments or a wide array of various system conditions, external application needs, node statuses, user permissions, or the like, as may be reflected in changes in a received data stream in real time. The AI selector is used to process received data in order to classify the received data for intelligent routing. The AI selector is also tasked with receiving and analyzing data from one or more system nodes or servers in order to also classify the current state, capacity, connection bandwidth, or other availability characteristic of the one or more system nodes, such as first node 201, second node 202, or the like. In any embodiment, the purpose of the AI selector is to aid selection of the optimal path for either a read data transaction or a write data transaction, and may output a decision of one or more nodes that are selected for possible execution of the data transaction. The input of data requests for read or write transactions are provided to the AI selector, at which point the AI selector runs a classification algorithm using multimodal data inputs from the data request and available stored data in order to generate a current classification of available connected nodes. For example, the AI selector may classify a given connected node as "highly recommended," "can be used," or "do not consider," or the like based on the current status of the node and the unique characteristics of the data request for the read or write transaction.

Moving further down the depiction in FIG. 6, various data characteristics are shown as exemplary embodiments of what a classification scheme may comprise as analyzed by the AI selector. These classification scheme data may include historical processing time 612, just-in-time (JIT) load 614, transaction type 616, backup node configuration 618, and latency needs 620. Historical processing time 612 may include historical data regarding processing data transactions of a similar type in the past, and may provide some insight to the AI selector as to what transaction efficiency may be predicted or expected for the same types of transactions or transactions that share similar data characteristics or carry similar requirements as this data is extrapolated by the machine learning model or neural network of the AI selector. Certain data transactions may involve JIT load 614 characteristics, which are material in determining an optimal path selection for a given data transaction request. For instance, a system implementing a JIT compiler typically continuously analyzes code being executed and identifies parts of the code where the speedup gained from compilation or recompilation would outweigh the overhead of compiling that code. JIT compilation is particularly suited for dynamic programming languages, as the runtime system can handle late-bound data types and enforce security guarantees. As such, a node may be selected based on its capacity to handle compatible programming languages based on its configuration or hardware capabilities. Transaction type 616 may aid the AI selector in automatically ruling out certain nodes, given that certain nodes may be read-only, and therefore can only handle read data transactions as opposed to both read and write transactions, as indicated by the read-only nodes 601. Similarly, the availability of backup node configuration 618 may also aid the AI selector in classifying a specific node path as "may be used" as opposed to "highly recommend," in situations where two nodes are identified as being suitable for the data transaction, but one would provide a clear advantage. In some cases, where there is no backup node configuration 618, the system may not highly recommend a given node, even though it provides a relatively high speed or efficiency rating, as a backup node configuration 618 may be required according to policy governing certain data types, entity rules, or the like. Latency needs 620 may also aid the AI selector in narrowing the path selection options by ruling out nodes that do not meet the latency needs 620 of a given data transaction request. Latency needs 620 may be constantly and dynamically monitored by the AI selector for one or more nodes, as the latency time for transacting with a given node may change based on predictable patterns in data flow, load capacity, time period, data type, or the like, which may be modeled and predicted by the AI selector.

Furthermore, the path selection system 110 includes connection type selector, as shown in block 622, security, as shown in block 624, and connector repository 630. These components are used to establish the connection for the selected path of a data transaction, and may base this decision on additional information from data sources 640. As shown, data sources 640 comprise data sources with schema 642 (e.g., structured data), data sources without schema 644 (e.g., unstructured data), and data sources with hybrid schema 646 (e.g., semi-structured data). Depending on the data source, the path selector system 110 may choose a particular connection type 622 or require a specific type of connection security 624, which may guide the selection of a particular connected node.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the entries of a flowchart may, in some embodiments, be in performed in an order other that the order illustrated, may be combined or divided, or may be performed simultaneously. It will also be understood that the entries of the block diagrams illustrated, in some embodiments, merely conceptual delineations between systems and one or more of the systems illustrated by an entry in the block diagrams may be combined or share hardware and/or software with another one or more of the systems illustrated by an entry in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent path selection in a distributed register environment, the system comprising:
one or more memory components having computer readable code stored thereon; and
one or more processing components operatively coupled to the one or more memory components, wherein the one or more processing components are configured to execute the computer readable code to:
receive a path selection request for one or more data transactions from one or more entities or user devices;
initiate collection of transaction data, connection data, and latency requirement;
parse the path selection request and analyze the collected transaction data, connection data, and latency requirement;
generate a classification for one or more connected nodes of the distributed register environment, wherein the one or more connected nodes of the distributed register environment each contain a complete copy of a distributed register;
dynamically update a data repository with the generated classification of the one or more connected nodes, wherein the generated classification of the one or more connected nodes comprises designating each of the one or more connected nodes as either a transacting node or a read only node, and wherein the classification for the one or more connected nodes of the distributed register environment further comprises a status selected from options of highly recommended, satisfactory, and not recommended;
generate a call to an artificial intelligence selector containing a machine learning algorithm via an encrypted cloud connection, wherein the call includes the path selection request and updated information for the dynamically updated data repository; and
receive a response from the artificial intelligence selector via the encrypted cloud connection comprising a path selection recommendation in response to the path selection request.

2. The system of claim 1, wherein the one or more data transactions further comprises a read transaction or a write transaction, and the one or more connected nodes of the distributed register environment comprise a read only node or a read and write node.

3. The system of claim 1, wherein the collected transaction data may be structured data, unstructured data, or semi-structured data.

4. The system of claim 1, further configured to provide an updated classification for the one or more connected nodes of the distributed register environment, via the user device, in real time, based on the dynamically updated data repository.

5. The system of claim 1, further comprising analyzing the one or more connected nodes of the distributed register environment via the artificial intelligence selector based on connection type, connection security protocol, or historical processing time to generate a predicted transaction time for a read transaction or a write transaction.

6. The system of claim 1, further configured to generate a classification for the one or more connected nodes of the distributed register environment based on an identified availability of one or more connected backup nodes.

7. A computer program product for intelligent path selection in a distributed register environment, the computer program product comprising a non-transitory computer-readable storage medium having computer-executable instructions to:
receive a path selection request for one or more data transactions from one or more entities or user devices;
initiate collection of transaction data, connection data, and latency requirement;
parse the path selection request and analyze the collected transaction data, connection data, and latency requirement via a machine learning algorithm;
generate a classification for one or more connected nodes of the distributed register environment, wherein the one or more connected nodes of the distributed register environment each contain a complete copy of a distributed register;
dynamically update a data repository with the generated classification of the one or more connected nodes, wherein the generated classification of the one or more connected nodes comprises designating each of the one or more connected nodes as either a transacting node or a read only node, and wherein the classification for the one or more connected nodes of the distributed register environment further comprises a status selected from options of highly recommended, satisfactory, and not recommended;
generate a call to an artificial intelligence selector containing a machine learning algorithm via an encrypted cloud connection, wherein the call includes the path selection request and updated information for the dynamically updated data repository; and
receive a response from the artificial intelligence selector via the encrypted cloud connection comprising a path selection recommendation in response to the path selection request.

8. The computer program product of claim 7, wherein the one or more data transactions further comprises a read transaction or a write transaction, and the one or more connected nodes of the distributed register environment comprise a read only node or a read and write node.

9. The computer program product of claim 7, wherein the collected transaction data may be structured data, unstructured data, or semi-structured data.

10. The computer program product of claim 7, further configured to provide an updated classification for the one or more connected nodes of the distributed register environment, via the user device, in real time, based on the dynamically updated data repository.

11. The computer program product of claim 7, further comprising analyzing the one or more connected nodes of the distributed register environment via artificial intelligence selector based on connection type, connection security protocol, or historical processing time to generate a predicted transaction time for a read transaction or a write transaction.

12. The computer program product of claim 7, further configured to generate a classification for the one or more connected nodes of the distributed register environment based on an identified availability of one or more connected backup nodes.

13. A computer implemented method for intelligent path selection in a distributed register environment, the computer implemented method comprising:
providing a computing system comprising a computer processing device and a non-transitory computer readable medium, where the non-transitory computer readable medium comprises configured computer program instruction code, such that when said instruction code is operated by said computer processing device, said computer processing device performs the following operations:

receiving a path selection request for one or more data transactions from one or more entities or user devices;

initiating collection of transaction data, connection data, and latency requirement;

parsing the path selection request and analyzing the collected transaction data, connection data, and latency requirement via a machine learning algorithm;

generating a classification for one or more connected nodes of the distributed register environment, wherein the one or more connected nodes of the distributed register environment each contain a complete copy of a distributed register;

dynamically updating a data repository with the generated classification of the one or more connected nodes, wherein the generated classification of the one or more connected nodes comprises designating each of the one or more connected nodes as either a transacting node or a read only node, and wherein the classification for the one or more connected nodes of the distributed register environment further comprises a status selected from options of highly recommended, satisfactory, and not recommended;

generating a call to an artificial intelligence selector containing a machine learning algorithm via an encrypted cloud connection, wherein the call includes the path selection request and updated information for the dynamically updated data repository;

receiving a response from the artificial intelligence selector via the encrypted cloud connection comprising a path selection recommendation in response to the path selection request.

14. The computer implemented method of claim 13, wherein the one or more data transactions further comprises a read transaction or a write transaction, and the one or more connected nodes of the distributed register environment comprise a read only node or a read and write node.

15. The computer implemented method of claim 13, wherein the collected transaction data may be structured data, unstructured data, or semi-structured data.

16. The computer implemented method of claim 13, further configured to provide an updated classification for the one or more connected nodes of the distributed register environment, via the user device, in real time, based on the dynamically updated data repository.

17. The computer implemented method of claim 13, further comprising analyzing the one or more connected nodes of the distributed register environment via the artificial intelligence selector based on connection type, connection security protocol, or historical processing time to generate a predicted transaction time for a read transaction or a write transaction.

* * * * *